(12) United States Patent
Hirano et al.

(10) Patent No.: US 12,253,135 B2
(45) Date of Patent: Mar. 18, 2025

(54) TUBULAR VIBRATION-DAMPING DEVICE

(71) Applicant: Sumitomo Riko Company Limited, Komaki (JP)

(72) Inventors: Masaaki Hirano, Komaki (JP); Takashi Kume, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 308 days.

(21) Appl. No.: 17/989,800

(22) Filed: Nov. 18, 2022

(65) Prior Publication Data
US 2023/0296154 A1   Sep. 21, 2023

(30) Foreign Application Priority Data
Mar. 18, 2022   (JP) .................................. 2022-043804

(51) Int. Cl.
*F16F 7/08*    (2006.01)
*F16F 1/38*    (2006.01)

(52) U.S. Cl.
CPC ............ *F16F 7/082* (2013.01); *F16F 1/3828* (2013.01); *F16F 1/3842* (2013.01); *F16F 2224/025* (2013.01); *F16F 2228/06* (2013.01)

(58) Field of Classification Search
None
See application file for complete search history.

(56) References Cited

U.S. PATENT DOCUMENTS

| | | | | |
|---|---|---|---|---|
| 5,257,680 A | * | 11/1993 | Corcoran ............... | F16F 13/04 188/290 |
| 5,549,182 A | * | 8/1996 | Ehrnsberger ............ | F16F 7/09 188/129 |
| 2006/0010935 A1 | * | 1/2006 | Park ...................... | D06F 37/20 68/3 R |
| 2018/0149227 A1 | | 5/2018 | Iwanaga | |

FOREIGN PATENT DOCUMENTS

| JP | S63-51943 | 4/1988 |
|---|---|---|
| JP | 2016061364 A | 4/2016 |

* cited by examiner

*Primary Examiner* — Melanie Torres Williams
(74) *Attorney, Agent, or Firm* — Jason M. Shapiro; Devlin Law Firm LLC

(57) ABSTRACT

A tubular vibration-damping device including an inner shaft member and an outer tube member connected by a main rubber elastic body. The outer tube member is configured to be slidably inserted in an attachment tube in an axial direction, and is circumferentially divided so as to be radially deformable or displaceable. A pair of tighteners are disposed on axially opposite sides of the main rubber elastic body. The main rubber elastic body is fastened to an inner circumferential surface of the outer tube member. An adjustment elastic body against which the tighteners are pressed is integrally formed with axially opposite side portions of the main rubber elastic body. Sliding resistance in the axial direction between an outer circumferential surface of the outer tube member and an inner circumferential surface of the attachment tube is settable depending on a pressing force of the tighteners against the adjustment elastic body.

7 Claims, 7 Drawing Sheets

TUBULAR VIBRATION-DAMPING DEVICE

INCORPORATED BY REFERENCE

The disclosure of Japanese Patent Application No. 2022-043804 filed on Mar. 18, 2022 including the specification, drawings and abstract is incorporated herein by reference in its entirety.

BACKGROUND ART

1. Technical Field

This disclosure relates to a tubular vibration-damping device for use in an automotive suspension mechanism and the like.

2. Description of the Related Art

Conventionally, tubular vibration-damping devices have been known for use in automotive suspension mechanisms and the like. The tubular vibration-damping device has a structure in which an inner shaft member and an outer tube member are elastically connected by a main rubber elastic body. An example of the tubular vibration-damping device is a bushing and the like, which is described in Japanese Unexamined Utility Model Publication No. JP-U-63-051943. The inner shaft member and the outer tube member are respectively attached to one and the other of the components subject to vibration damping linkage, thereby connecting the components in a vibration damping manner.

SUMMARY

Meanwhile, when a tubular vibration-damping device is used in a suspension mechanism, for example, improvement in driving stability is achieved by increasing the axial spring constant in the initial period of input. However, when the axial spring constant is large, the vibration state deteriorates and the ride comfort becomes poor. Therefore, it is desirable that the axial spring constant of the tubular vibration-damping device used in the suspension mechanism be quickly increased in the initial period of input to achieve good driving stability, while being kept small in a large input state where the input increases to a range that affects the ride comfort.

Thus, in JP-U-63-051943, the outer tube member is attached to an attachment tube (a cylinder) in an inserted state, and the outer tube member is configured to slide in the axial direction with respect to the attachment tube when an axial load of a predetermined value or greater is input. By so doing, in the small input state where the outer tube member does not slide with respect to the attachment tube, the axial spring constant quickly increases, while in the large input state where the outer tube member slides with respect to the attachment tube, the increase in the axial spring constant is suppressed and a good ride comfort can be expected due to low dynamic spring characteristics.

However, in the structure of JP-U-63-051943, it is difficult to set the load threshold value at which the outer tube member slides out with respect to the attachment tube part, and it is difficult to compatibly achieve the traveling performance and the ride comfort with sufficient accuracy. Besides, it is difficult to adjust the spring characteristics of the tubular vibration-damping device after the manufacture, and it is difficult to meet various spring characteristics requirements with a single tubular vibration-damping device.

It is therefore one object of the present disclosure to provide a tubular vibration-damping device of novel structure which is able to accurately realize each of high dynamic spring characteristics when the input is small and low dynamic spring characteristics when the input is large, depending on the required characteristics, and to obtain the desired spring characteristics.

Hereinafter, preferred embodiments for grasping the present disclosure will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present disclosure, various other preferred embodiments can be realized without being limited to those described below.

A first preferred embodiment provides a tubular vibration-damping device comprising an inner shaft member and an outer tube member connected by a main rubber elastic body, the outer tube member being configured to be attached to an attachment tube in an inserted state where the outer tube member is slidable in an axial direction, wherein the outer tube member is divided at least at a part in a circumferential direction and is deformable or displaceable in a radial direction, a pair of tighteners are disposed on axially opposite sides of the main rubber elastic body, the main rubber elastic body is fastened to an inner circumferential surface of the outer tube member, an adjustment elastic body against which the pair of the tighteners are pressed is integrally formed with axially opposite side portions of the main rubber elastic body, and sliding resistance in the axial direction between an outer circumferential surface of the outer tube member and an inner circumferential surface of the attachment tube is settable depending on a pressing force of the pair of the tighteners against the adjustment elastic body.

According to the tubular vibration-damping device structured following the present preferred embodiment, the larger the amount of compressive deformation of the adjustment elastic body due to the contact of the tighteners, the harder the spring of the tubular vibration-damping device in the axial direction becomes. This makes it possible to tune the spring characteristics of the tubular vibration-damping device by appropriately setting the amount of compressive deformation of the adjustment elastic body due to the tighteners.

Additionally, since the outer tube member is allowed to slide with respect to the attachment tube in the axial direction, the device exhibits each of the high dynamic spring characteristics with respect to small axial inputs where the outer tube member does not slide with respect to the attachment tube and the low dynamic spring characteristics with respect to large axial inputs where the outer tube member slides with respect to the attachment tube.

The sliding resistance acting between the outer tube member and the attachment tube is settable by adjusting the distance between opposed faces of the pair of the tighteners in the axial direction and adjusting the amount of compressive deformation of the adjustment elastic body due to the contact of the tighteners. This makes it possible to easily and accurately set the threshold value for switching between the high dynamic spring characteristics exhibited when the outer tube member does not slide with respect to the attachment tube, and the low dynamic spring characteristics exhibited when the outer tube member slides with respect to the attachment tube.

A second preferred embodiment provides the tubular vibration-damping device according to the first preferred embodiment, wherein the pair of the tighteners are opposed to the outer tube member in the axial direction, the adjustment elastic body is disposed on an opposed face of the outer tube member that is opposed to each of the pair of the tighteners in the axial direction, and the main rubber elastic body and the adjustment elastic body are integrally formed on an inner circumference of the outer tube member by being integrally connected by a connecting rubber.

According to the tubular vibration-damping device structured following the present preferred embodiment, the adjustment elastic body is provided on the opposed face of the outer tube member that is opposed to the tightener in the axial direction. Thus, the adjustment elastic body is efficiently compressed and deformed by being clasped between the opposed faces of the outer tube member and the tightener.

Besides, the adjustment elastic body is integrally connected to the main rubber elastic body via the connecting rubber on the inner circumference of the outer tube member. Thus, when the adjustment elastic body undergoes swelling deformation in the radial direction due to compressive deformation in the axial direction, the deformation of the adjustment elastic body is transmitted to the main rubber elastic body via the connecting rubber. Therefore, when the adjustment elastic body is compressed and deformed by being pressed by the tightener, the main rubber elastic body deforms to push the outer tube member toward the radially outer side, and the outer tube member is pressed against the attachment tube. Accordingly, the sliding resistance of the outer tube member with respect to the attachment tube can be set by the amount of compressive deformation of the adjustment elastic body.

A third preferred embodiment provides the tubular vibration-damping device according to the second preferred embodiment, wherein the outer tube member has a groove-shaped cross section that opens radially inward, and the outer tube member includes a peripheral wall part extending in the axial direction and a pair of support parts projecting radially inward from axially opposite ends of the peripheral wall part, the adjustment elastic body is fastened to an axially outer face of each of the pair of the support parts, and an inside of the outer tube member surrounded by the peripheral wall part and the pair of the support parts is filled with the main rubber elastic body.

According to the tubular vibration-damping device structured following the present preferred embodiment, the main rubber elastic body is disposed in a filled state in the inside of the outer tube member which has a groove-shaped cross section. This makes it possible to reliably obtain a large rubber volume of the main rubber elastic body on the radially inner side of the outer tube member, thereby efficiently obtaining the force toward the radially outer side which is transmitted from the adjustment elastic body to the main rubber elastic body and is exerted on the outer tube member.

Since the outer tube member has a groove-shaped cross section, the pair of the support parts, which constitute side walls, reliably obtain a large face of the outer tube member opposed to the tightener in the axial direction. This makes it possible to improve the fastening strength of the adjustment elastic body with respect to the outer tube member and set the shape and size of the adjustment elastic body with a large degree of freedom.

A fourth preferred embodiment provides the tubular vibration-damping device according to any one of the first through third preferred embodiments, wherein the pair of the tighteners have an annular-plate shape, and a radially inner portion of the pair of the tighteners includes a positioning part that is positioned with respect to the inner shaft member in the axial direction.

According to the tubular vibration-damping device structured following the present preferred embodiment, the amount of compressive deformation of the adjustment elastic body by being pressed by the tightener is accurately set by positioning the tightener with respect to the inner shaft member in the axial direction by the positioning part.

A fifth preferred embodiment provides the tubular vibration-damping device according to the fourth preferred embodiment, wherein the inner shaft member includes a regulating part that is disposed between axially opposed faces of the pair of the tighteners and regulates a distance between the axially opposed faces of the pair of the tighteners, and a contact portion of the pair of the tighteners that is held in contact with the regulating part constitutes the positioning part.

According to the tubular vibration-damping device structured following the present preferred embodiment, the amount of compressive deformation of the adjustment elastic body due to the tighteners can be accurately set by regulating the distance between the axially opposed faces of the pair of the tighteners by the axial length of the regulating part.

A sixth preferred embodiment provides the tubular vibration-damping device according to the fourth or fifth preferred embodiment, wherein the positioning part of the pair of the tighteners is constituted by an inner contact part that is held in contact with the inner shaft member from an axially outer side, a radially outer portion of the pair of the tighteners includes an elastic body contact part that is held in contact with the adjustment elastic body from the axially outer side, and an axial position of a contact face of the inner contact part of the pair of the tighteners that is held in contact with the inner shaft member and an axial position of a contact face of the elastic body contact part that is held in contact with the adjustment elastic body are different from each other.

According to the tubular vibration-damping device structured following the present preferred embodiment, the amount of compressive deformation of the adjustment elastic body due to contact of the tighteners can also be adjusted and set by providing the contact face of the inner contact part of the pair of the tighteners that is held in contact with the inner shaft member and the contact face of the elastic body contact part that is held in contact with the adjustment elastic body at the positions different from each other in the axial direction.

A seventh preferred embodiment provides the tubular vibration-damping device according to any one of the first through sixth preferred embodiments, further comprising a tubular body configured to be fixedly mounted onto a component subject to vibration damping linkage and constitute the attachment tube, wherein the outer tube member is attached to the tubular body in the inserted state where the outer tube member is slidable in the axial direction, and a detent part configured to limit an amount of movement of the outer tube member due to a slide in the axial direction with respect to the tubular body is provided.

According to the tubular vibration-damping device structured following the present preferred embodiment, the slide of the outer tube member with respect to the tubular body is allowed, while the detent part is able to prevent the outer tube member from slipping out of the tubular body.

The present disclosure is able to accurately realize each of high dynamic spring characteristics when the input is small and low dynamic spring characteristics when the input is large, depending on the required characteristics, and to obtain the desired spring characteristics.

BRIEF DESCRIPTION OF THE DRAWINGS

The foregoing and/or other objects, features and advantages of the disclosure will become more apparent from the following description of practical embodiments with reference to the accompanying drawings in which like reference numerals designate like elements and wherein.

DETAILED DESCRIPTION

Practical embodiments of the present disclosure will be described below in reference to the drawings.

Figure 1:
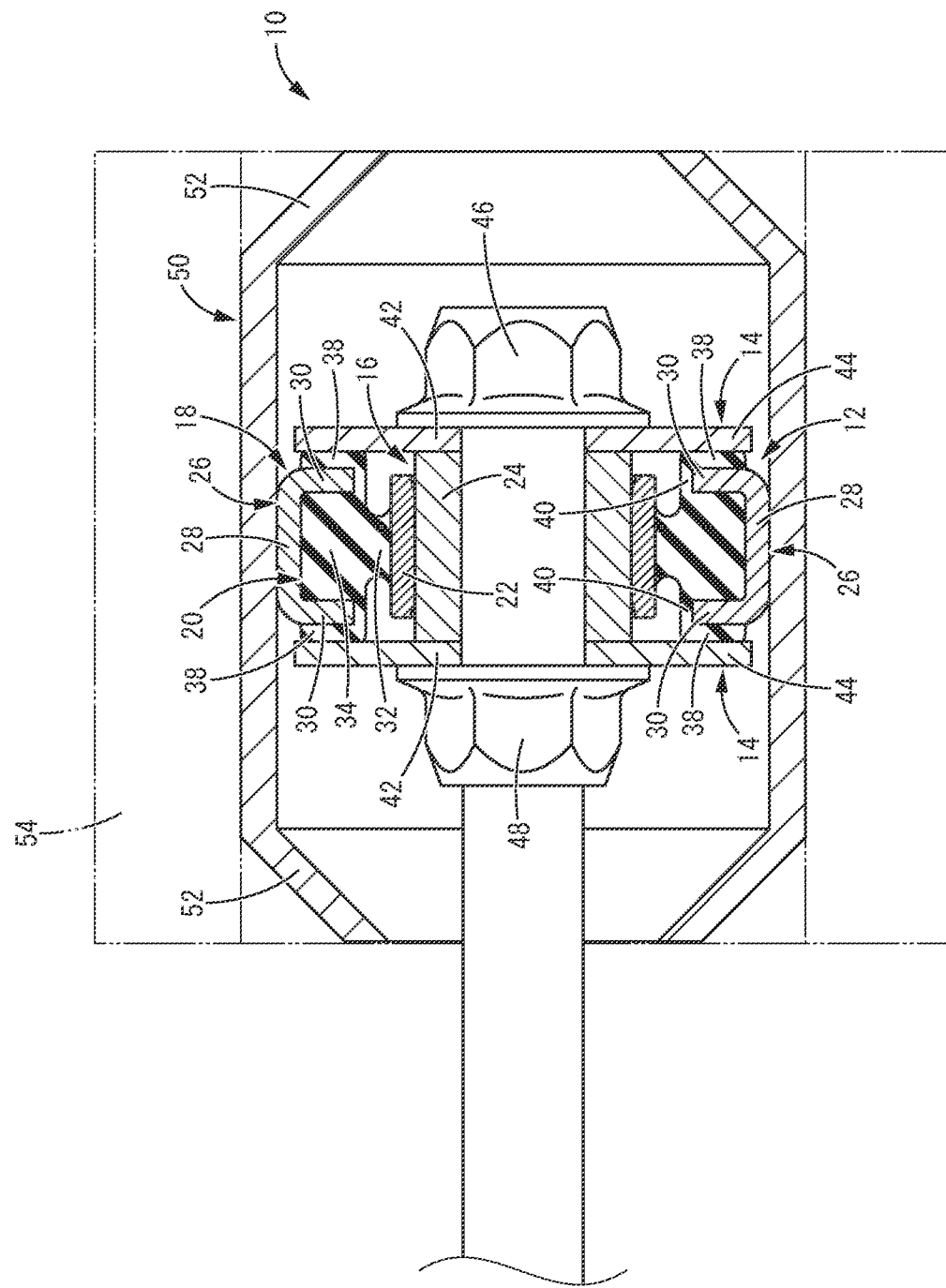
FIG. 1 is a cross sectional view showing a tubular vibration-damping device in the form of a bushing as a first practical embodiment of the present disclosure.
Figure 2:
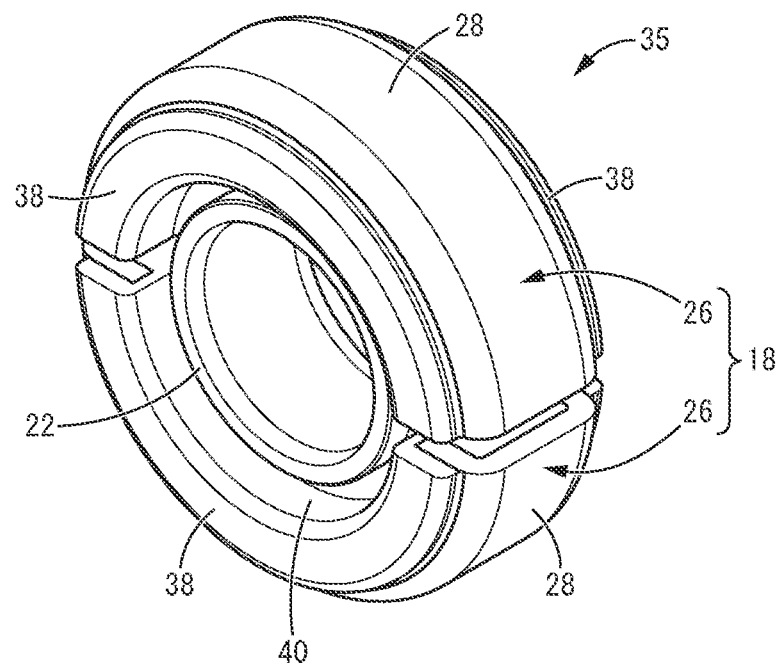
FIG. 2 is a perspective view of an integrally vulcanization molded component constituting the bushing shown in FIG. 1.

FIG. 1 depicts an automotive bushing 10 as a first practical embodiment of a tubular vibration-damping device structured following the present disclosure, in a mounted state on a vehicle. The bushing 10 has a structure in which a pair of tighteners 14, 14 are attached to a bushing body 12. In the description hereinbelow, as a general rule, the vertical direction refers to the vertical direction in FIG. 1, the left-right direction refers to the direction orthogonal to the plane of the page of FIG. 1 (the left-right direction in FIG. 3 described later), and the front-back direction refers to the left-right direction in FIG. 1, which coincides with the axial direction.

The bushing body 12 has a structure in which an inner shaft member 16 and an outer tube member 18 are elastically connected by a main rubber elastic body 20. In the present practical embodiment, the bushing body 12 has a symmetrical shape with respect to a plane that is orthogonal to the axial direction. In addition, the bushing body 12 has a rotationally symmetrical shape of 180° with respect to the central axis.

The inner shaft member 16 of the present practical embodiment has an approximately cylindrical shape overall, and is constituted by a fastening member 22 fastened to the inner circumferential surface of the main rubber elastic body 20 and an inner tube member 24 which is disposed on the radially inner side of the fastening member 22 and serves as a regulating part. As shown in FIGS. 2 to 5, the fastening member 22 has an approximately cylindrical shape, and the axially opposite ends of its inner circumferential surface become larger in diameter toward the axially outer side. The inner tube member 24 has an approximately cylindrical shape with a smaller diameter than the fastening member 22, as shown in FIG. 1. Also, the inner tube member 24 is thicker in the radial direction than the fastening member 22, and is larger in the axial dimension than the fastening member 22. Both the fastening member 22 and the inner tube member 24 are made of metal, and the inner tube member 24 is inserted through the fastening member 22 in a press-fit state.

The outer tube member 18 has an approximately cylindrical shape overall and is constituted by a pair of outer constituent fittings 26, 26 arranged in opposition to each other in the diametrical as shown in FIGS. 2 to 5. The outer constituent fitting 26 has a groove-shaped cross section in a U shape opening radially inward and extending in the circumferential direction for a length of less than half a circumference. More specifically, the outer constituent fitting 26 includes a tubular bottom wall 28, which serves as a peripheral wall part, and a pair of side walls 30, 30, which serve as support parts and project radially inward from the axially opposite ends of the bottom wall 28. The pair of the outer constituent fittings 26, 26 are arranged with the inner shaft member 16 interposed therebetween in the diametrical direction, and the outer tube member 18 is externally placed around the inner shaft member 16. The circumferential ends of the pair of the outer constituent fittings 26, 26 are separated from each other in the circumferential direction, and the outer tube member 18 is divided at two locations in the circumferential direction. The outer tube member 18 has a symmetrical shape with respect to a plane that is orthogonal to the axial direction. In addition, the outer tube member 18 has a rotationally symmetrical shape of 180° with respect to the central axis.

Figure 5:
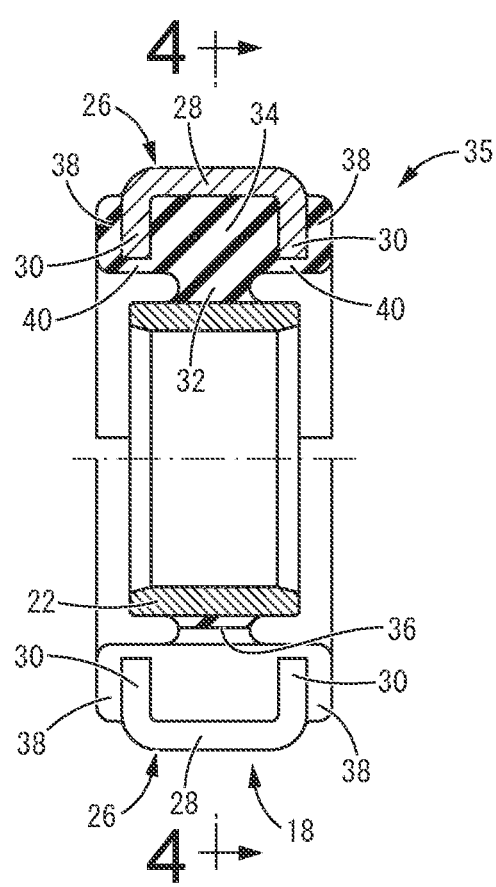
FIG. 5 is a cross sectional view taken along line 5-5 of FIG. 3.

The main rubber elastic body 20 has an annular shape overall with its radially inner portion 32 being thinner than its radially outer portion 34 in the axial direction, as shown in FIG. 5. The radially inner portion 32 of the main rubber elastic body 20 has an axial width dimension that is smaller than the distance between the opposed faces of the pair of the side walls 30, 30 of the outer tube member 18.

The radially outer portion 34 of the main rubber elastic body 20, which is wide, is fastened to the inner surface of the outer tube member 18 having the groove-shaped cross section, and the inside of the groove of the outer tube member 18 surrounded by the bottom wall 28 and the side walls 30, 30 is filled with the radially outer portion 34 of the main rubber elastic body 20. The main rubber elastic body 20 is fastened to the inner circumferential surface of the outer tube member 18. The radially inner portion 32 of the main rubber elastic body 20 protrudes radially inward further than the outer tube member 18, with its inner circumferential surface being fastened to the fastening member 22 that constitutes the inner shaft member 16. The main rubber elastic body 20 of the present practical embodiment is formed as an integrally vulcanization molded component 35 including the fastening member 22 and the outer tube member 18.

Figure 3:
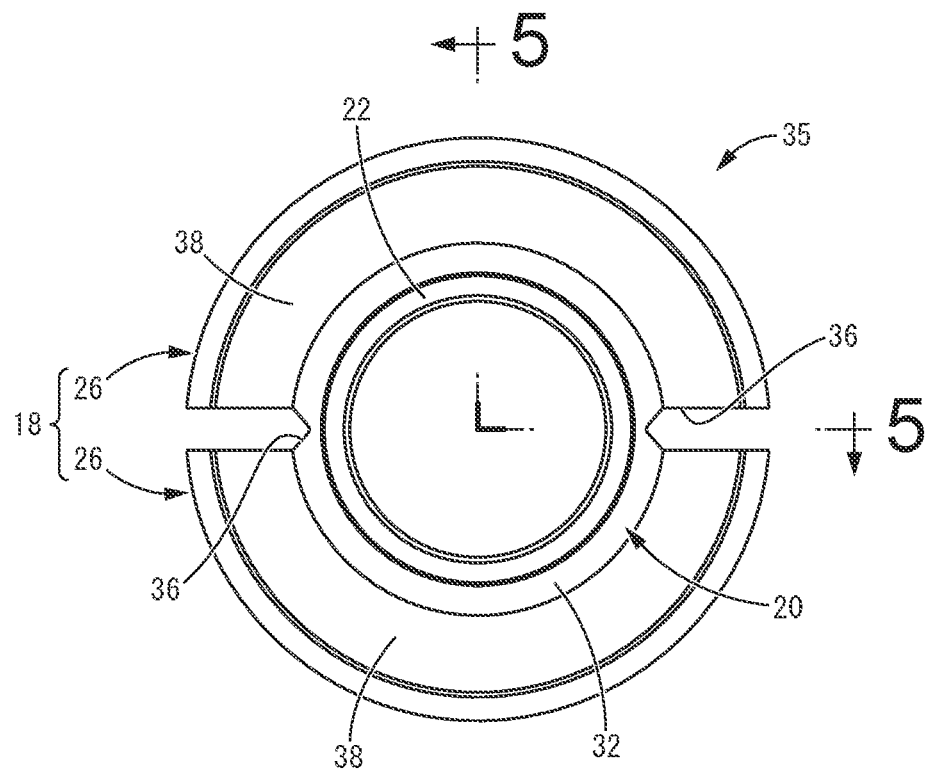
FIG. 3 is a front view of the integrally vulcanization molded component shown in FIG. 1.
Figure 4:
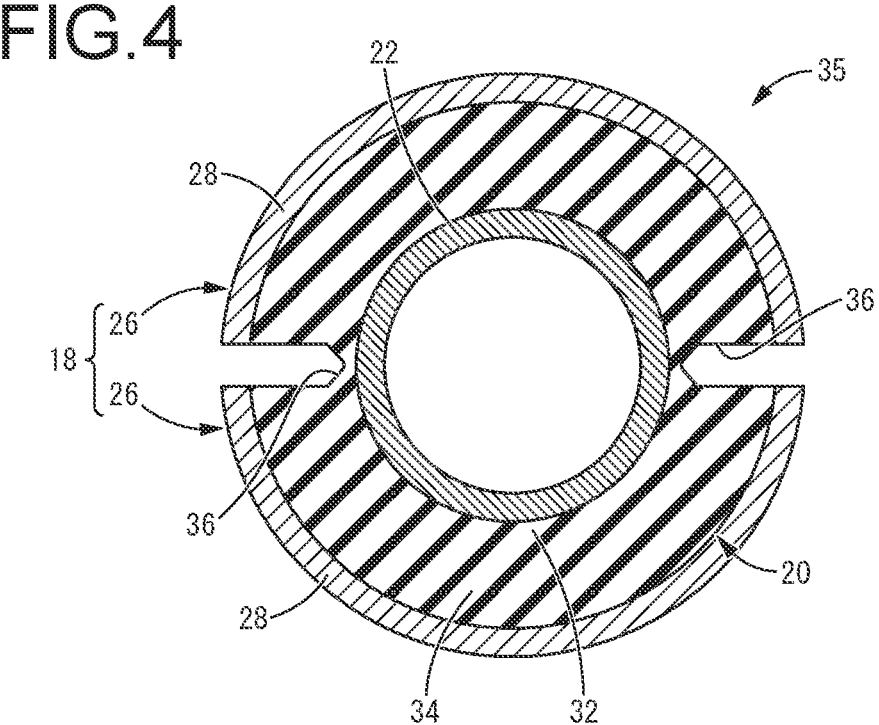
FIG. 4 is a cross sectional view of the integrally vulcanization molded component shown in FIG. 1, taken along line 4-4 of FIG. 5.

As shown in FIGS. 3 and 4, the main rubber elastic body 20 includes notches 36, 36 opening radially outward circumferentially between the outer constituent fittings 26, 26. The inner surface of the notch 36 is configured such that its bottom part, which is the inner circumferential surface, extends in the axial direction with a V-shaped cross section, while the circumferentially opposite side surfaces are remote from each other in the circumferential direction and each extend in the left-right direction, so as to spread generally parallel to each other. As shown in FIG. 4, the main rubber elastic body 20 is configured such that, at the portion forming the notch 36, only the radially inner end of the radially inner portion 32 is continuous in the circumferential direction.

As shown in FIG. 5, an adjustment elastic body 38 is fastened to the side wall 30 of the outer constituent fitting 26, which constitutes the outer tube member 18. The adjustment elastic body 38 is formed of a rubber elastic body, and is fastened to the axially outer face of the side wall 30, so as to cover the axially outer face of the side wall 30 approximately in its entirety. The adjustment elastic body 38 is continuous with the main rubber elastic body 20 by means of a connecting rubber 40 that covers the inner circumferential surface of the side wall 30, and is integrally formed with the main rubber elastic body 20 via the connecting rubber 40. The adjustment elastic body 38 integrally formed with the main rubber elastic body 20 is provided on axially opposite side portions of the main rubber elastic body 20. The adjustment elastic body 38 is fastened to each of the pair of the side walls 30, 30.

In the present practical embodiment, the outer tube member 18 has a groove-shaped cross section, and the adjustment elastic body 38 is fastened to the axially outer face of the side wall 30, which extends in the generally axis-perpendicular direction. This makes it possible to obtain a large fastening area of the adjustment elastic body 38 to the outer tube member 18, thereby affording improvement in fastening strength. Furthermore, the size and shape of the adjustment elastic body 38 can be set with a large degree of freedom.

As shown in FIG. 1, the pair of the tighteners 14, 14 are disposed on the axially opposite sides of the bushing body 12. The tightener 14 is an annular-plate shaped member, and in the present practical embodiment, has a generally constant thickness in its entirety. The radially inner end of the tightener 14 constitutes a positioning part 42 that is overlapped on the inner tube member 24 in the axial direction, and the radially outer end thereof constitutes an elastic body contact part 44 that is pressed against the adjustment elastic body 38 in the axial direction. In the present practical embodiment, the positioning part 42 and the elastic body contact part 44 of the tightener 14 extend in the axis-perpendicular direction on approximately the same plane. The tightener 14 has an inside diameter dimension that is approximately the same as the inside diameter dimension of the inner tube member 24. Meanwhile, the tightener 14 has an outside diameter dimension that is larger than the inside diameter dimension of the side wall 30 of the outer tube member 18 and is smaller than the outside diameter dimension of the bottom wall 28 of the outer tube member 18. The outside diameter dimension of the tightener 14 of the present practical embodiment is approximately the same as the inside diameter dimension of the bottom wall 28 of the outer tube member 18.

The positioning part 42 at the radially inner end of the pair of the tighteners 14, 14 is overlapped on the inner tube member 24 of the inner shaft member 16 from the axially opposite sides. Regarding the tighteners 14, 14 overlapped on the inner tube member 24, the positioning parts 42, 42 are tightened axially inward by a bolt member 46 inserted through the inner shaft member 16 and a nut 48 screwed onto the bolt member 46, and the positioning parts 42, 42 are pressed against the inner tube member 24, which is the regulating part, from the axially opposite sides. By so doing, the tighteners 14, 14 are fixed to the inner shaft member 16 and provided so as to project radially outward from the inner shaft member 16. The tighteners 14, 14 are positioned in the axial direction with respect to the inner shaft member 16 by the contact of the positioning parts 42, 42 with the inner tube member 24, and the distance between the axially opposed faces of the tighteners 14, 14 is regulated by the axial length dimension of the inner tube member 24. The elastic body contact parts 44, 44 of the tighteners 14, 14 are disposed on the axially opposite sides of the main rubber elastic body 20 and are disposed so as to be opposed to the side walls 30, 30 of the outer tube member 18 in the axial direction. The adjustment elastic body 38 integrally formed with the main rubber elastic body 20 is disposed on the opposed face of the side walls 30, 30 of the outer tube member 18 that is opposed to the elastic body contact parts 44, 44 in the axial direction.

The bolt member 46 constitutes a part of, or is attached to, one of the components subject to vibration damping linkage. By the bushing body 12 and the pair of the tighteners 14, 14 being attached to one end of the bolt member 46, the bushing 10 is attached to one of the components subject to vibration damping linkage. Examples of one of the components subject to vibration damping linkage include a vehicle body, a sub frame (a suspension member), and the like.

An outer sleeve 50 serving as a tubular body constituting the attachment tube is attached to the outer tube member 18 of the bushing body 12. The outer sleeve 50 has an approximately cylindrical shape, and is externally attached around the bottom walls 28, 28 of the outer tube member 18. The axial length dimension of the outer sleeve 50 is larger than that of the outer tube member 18, and in the present practical embodiment, is larger than the distance between the axially outer faces of the pair of the tighteners 14, 14 arranged on the axially opposite outer sides of the bushing body 12.

The axially opposite end portions of the outer sleeve 50 constitute constricted parts 52, 52 serving as detent parts. The constricted part 52 has a tapered shape that slopes radially inward toward the axially outer side. The minimum inside diameter dimension of the constricted part 52 is smaller than the outside diameter dimension of the outer tube member 18 and the outside diameter dimension of the tightener 14. By the outer tube member 18 coming into contact with the constricted part 52 via the tightener 14, the bushing 10 is prevented from slipping out of the outer sleeve 50.

The outer sleeve 50 is, for example, fixedly mounted onto an arm eye 54 of a link arm, which is the other tube component subject to vibration damping linkage in the suspension mechanism, by means of press-fitting or the like. By so doing, the outer tube member 18 is attached to the other of the components subject to vibration damping linkage (the link arm) via the outer sleeve 50, and the outer sleeve 50 and the arm eye 54 constitute the attachment tube of the present practical embodiment.

The outer tube member 18 is attached to the outer sleeve 50 in an inserted state of being slidable in the axial direction. That is, the outer circumferential surface of the outer tube member 18 is overlapped so as to be pressed against the inner circumferential surface of the outer sleeve 50, and frictional resistance force acts between the outer tube member 18 and the outer sleeve 50. When the axial force acting on the outer tube member 18 side exceeds the frictional resistance force acting between the outer circumferential surface of the outer tube member 18 and the inner circumferential surface of the outer sleeve 50, the outer tube member 18 is displaced with respect to the outer sleeve 50 in the axial direction.

Figure 6:
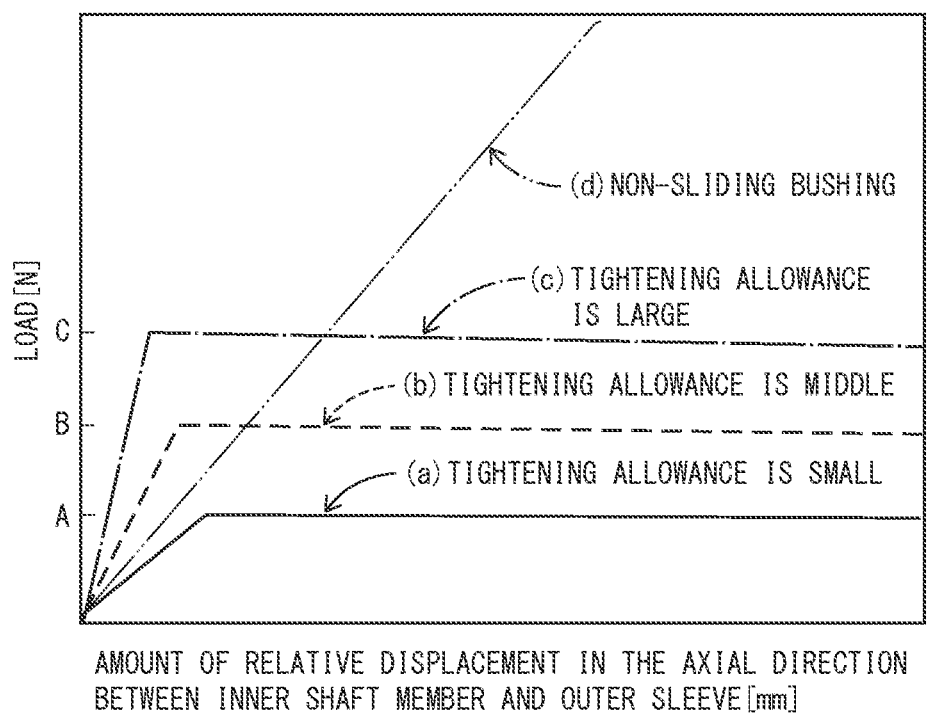
FIG. 6 is a graph showing load-deflection characteristics of the bushing shown in FIG. 1.

When the outer tube member 18 slides with respect to the outer sleeve 50, as shown in FIG. 6, it is possible to prevent the spring characteristics of the bushing 10 from becoming harder even if the amount of relative displacement in the axial direction between the inner shaft member 16 and the outer sleeve 50 increases. That is, as shown in (a) to (c) in FIG. 6, which shows the spring characteristics of the bushing 10, before the slide of the outer tube member 18 with respect to the outer sleeve 50 occurs, the spring of the bushing 10 becomes harder as the amount of relative displacement in the axial direction between the inner shaft member 16 and the outer sleeve 50 increases. On the other hand, when the outer tube member 18 begins to slide with respect to the outer sleeve 50, increase in load with respect to the increase in the amount of relative displacement in the axial direction between the inner shaft member 16 and the outer sleeve 50 is reduced or avoided, thereby preventing increase in the spring of the bushing 10. Here, (d), shown in FIG. 6 by the chain double-dashed line, indicates spring characteristics in the case where the outer tube member 18 and outer sleeve 50 are fixed and no slide occurs.

In this way, according to the bushing 10 of the present practical embodiment, in the range where the input load is small, the slide of the outer tube member 18 with respect to the outer sleeve 50 does not occur, and the high dynamic spring characteristics are exhibited. On the other hand, in the range where the input load is large, the slide of the outer tube member 18 with respect to the outer sleeve 50 occurs, and the low dynamic spring characteristics are exhibited. Therefore, for example, if the bushing 10 is applied to a suspension mechanism, in the initial period of low input load, excellent steering stability is achieved due to the high dynamic spring characteristics, and when the load increases, a good ride comfort is realized by the vibration insulating action or the like due to the low dynamic spring characteristics.

Here, by setting the amount of compressive deformation of each adjustment elastic body 38 by the pair of the tighteners 14, 14, the spring characteristics of the bushing 10 in the axial direction can be adjusted.

Specifically, when the pair of the tighteners 14, 14 approach until they are pressed against the inner tube member 24 by the bolt member 46 and the nut 48, as shown in FIG. 1, the pair of the tighteners 14, 14 are pressed against the corresponding adjustment elastic body 38 of the bushing body 12, and the adjustment elastic body 38 is compressed between the side wall 30 of the outer tube member 18 and the tightener 14 in the axial direction.

The spring of the adjustment elastic body 38 in the axial direction becomes harder as the amount of compressive deformation in the axial direction due to the contact of the tightener 14 increases. Therefore, by appropriately adjusting the amount of compressive deformation of the adjustment elastic body 38 due to the contact of the tightener 14, the spring characteristics in the axial direction of the adjustment elastic body 38 can be tuned, thereby tuning the spring characteristics in the axial direction of the bushing 10.

When the adjustment elastic body 38 is compressed in the axial direction, the adjustment elastic body 38 is deformed so as to swell radially inward, and the said deformation is transmitted to the main rubber elastic body 20 integrally formed via the connecting rubber 40, so that the main rubber elastic body 20 is deformed so as to swell radially outward. Since the main rubber elastic body 20 is located on the inner circumference of the outer tube member 18, the outer tube member 18 is pushed radially outward due to the deformation of the main rubber elastic body 20.

In the present practical embodiment, since the swelling deformation of the main rubber elastic body 20 toward the radially inner side is limited by the cylindrical fastening member 22, the swelling deformation of the main rubber elastic body 20 toward the radially outer side can be generated more efficiently. In addition, the main rubber elastic body 20 is disposed in a filled state in the inside of the outer tube member 18, which has a groove-shaped cross section. Thus, the rubber volume of the main rubber elastic body 20 is largely obtained in the inside of the outer tube member 18 while suppressing increase in diameter of the bushing 10, thereby efficiently obtaining the action of the main rubber elastic body 20 that pushes the outer tube member 18 radially outward.

The outer tube member 18 is constituted by the pair of the outer constituent fittings 26, 26 that are mutually divided. Thus, when the main rubber elastic body 20 fastened to the inner circumferential surface the outer tube member 18 attempts to undergo swelling deformation to the radially outer side, the outer constituent fittings 26, 26 are subjected to force toward the vertically opposite outer sides and are going to be deformed so as to be separated from each other. As a result, the outer surfaces of the bottom walls 28, 28 of the outer constituent fittings 26, 26, which constitute the outer circumferential surface of the outer tube member 18, are pressed more strongly against the inner circumferential surface of the outer sleeve 50. Accordingly, by adjusting the amount of compressive deformation of the adjustment elastic body 38 depending on the pressing force of the pair of the tighteners 14, 14, the contact pressure of the outer tube member 18 with respect to the outer sleeve 50 in the radial direction can be adjusted. By adjusting the contact pressure of the outer tube member 18 and the outer sleeve 50 in the radial direction in this way, the sliding resistance in the axial direction between the outer circumferential surface of the outer tube member 18 and the inner circumferential surface of the outer sleeve 50 is settable.

By adjusting the frictional resistance force between the overlapped surfaces of the outer tube member 18 and the outer sleeve 50, the threshold value of the load at which the slide of the outer tube member 18 with respect to the outer sleeve 50 begins can be adjusted. Therefore, by adjusting the amount of compressive deformation of each adjustment elastic body 38 in the axial direction due to the pair of the tighteners 14, 14, it is possible to set the load threshold value at which the slide of the outer tube member 18 with respect to the outer sleeve 50 begins.

For example, (a) to (c) shown in FIG. 6 are graphs in which changes in spring characteristics are measured when the amount of compressive deformation of the adjustment elastic body 38 in the bushing 10 is varied from each other. Described more specifically, (a) is the case where the amount of compressive deformation of the adjustment elastic body 38 is the smallest, (c) is the case where the amount of compressive deformation of the adjustment elastic body 38 is the largest, and (b) is the case where the amount of compressive deformation of the adjustment elastic body 38 is larger than (a) and smaller than (c). FIG. 6 shows that as the amount of compressive deformation of the adjustment elastic body 38 increases, the load threshold values (A, B, and C on the vertical axis) at which the slide begins become larger. This can be considered to indicate that as the amount of compressive deformation of the adjustment elastic body 38 increases, the frictional resistance force acting between the outer tube member 18 and the outer sleeve 50 increases, so that the slide of the outer tube member 18 with respect to the outer sleeve 50 does not occur until a larger load input is applied. Therefore, by adjusting the amount of compressive deformation of the adjustment elastic body 38, the load threshold value at which the slide of the outer tube member 18 with respect to the outer sleeve 50 begins can be set accurately and easily depending on the required performance.

The amount of compressive deformation of the adjustment elastic body 38 can be set precisely and easily by the length dimension of the inner tube member 24 arranged between the axially opposed faces of the pair of the tighteners 14, 14. That is, when the length dimension of the inner tube member 24 increases, the amount of compressive deformation of the adjustment elastic body 38 decreases, and when the length dimension of the inner tube member 24 decreases, the amount of compressive deformation of the adjustment elastic body 38 increases. Therefore, for example, by preparing multiple types of the inner tube members 24 with mutually different lengths, then selecting and employing the inner tube member 24 with the length according to the required characteristics from these multiple types of inner tube members 24, it is also possible to obtain multiple types of the bushings 10 with mutually different spring characteristics while using a common structure for the parts other than the inner tube member 24.

Figure 7:
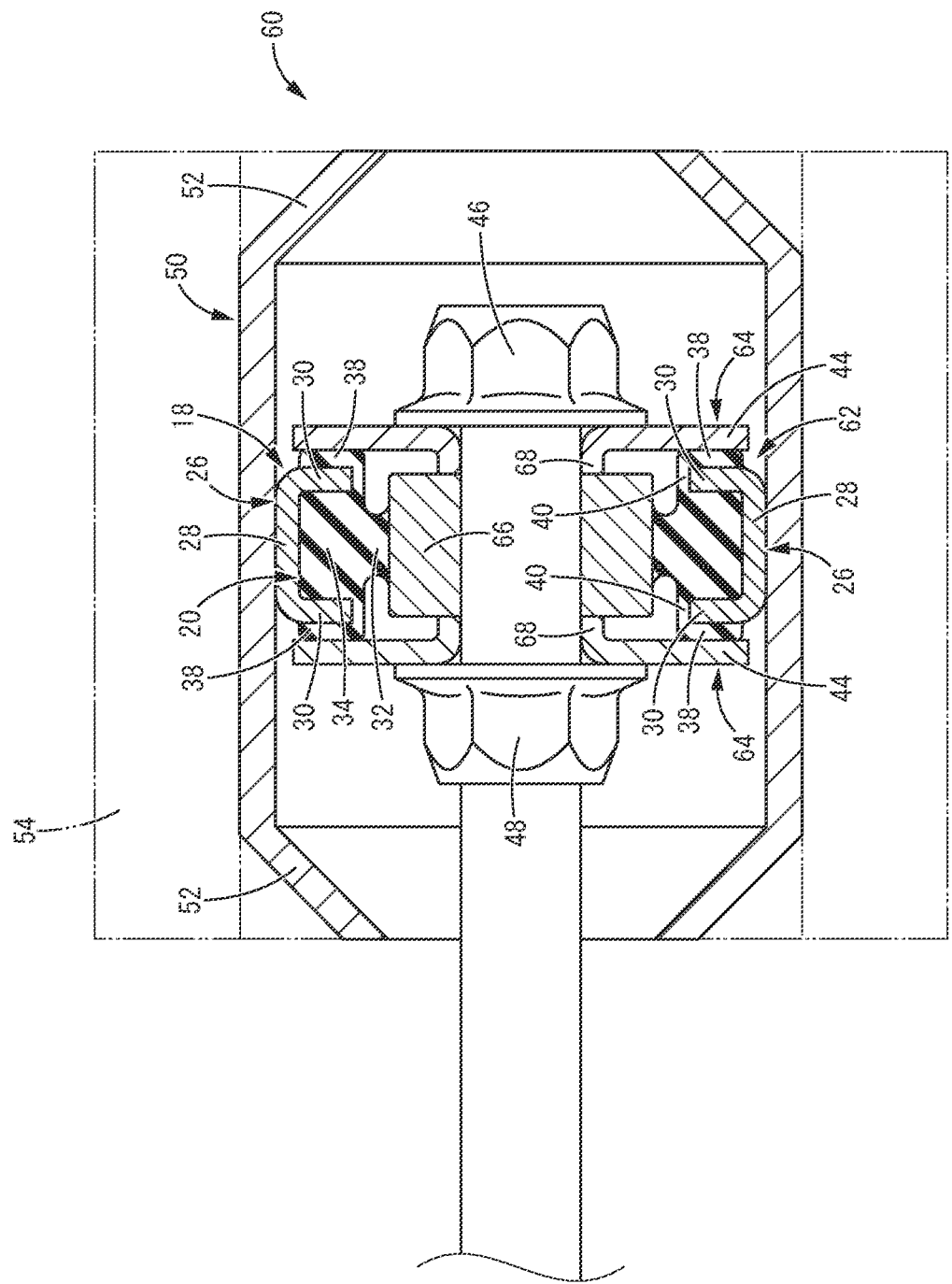
FIG. 7 is a cross sectional view showing a bushing as a second practical embodiment of the present disclosure.

FIG. 7 depicts an automotive bushing 60 as a second practical embodiment of the tubular vibration-damping device according to the present disclosure. The bushing 60 includes a bushing body 62 and a pair of tighteners 64, 64. In the following description, components and parts that are substantially identical with those in the first practical embodiment will be assigned like symbols and not described in any detail.

The bushing body 62 has a structure in which an inner shaft member 66 and the outer tube member 18 are elastically connected by the main rubber elastic body 20. The inner shaft member 66 has a thick-walled, small-diameter, approximately cylindrical shape, and the radially inner portion 32 of the main rubber elastic body 20 is fastened to the outer circumferential surface of the inner shaft member 66. The inner shaft member 66 is externally attached around the bolt member 46. The bushing body 62 of the present practical embodiment is an integrally vulcanization molded component of the main rubber elastic body 20 including the inner shaft member 66 and the outer tube member 18.

The pair of the tighteners 64, 64 are arranged on axially opposite sides of the inner shaft member 66. The tightener 64 is an annular-plate shaped member and includes an inner contact part 68 serving as a positioning part at its radially inner end that projects axially inward. The radially inner end of the tightener 64 of the present practical embodiment is bent in the axial direction so as to extend in the circumferential direction with an L-shaped cross section, and the inner contact part 68, which is the positioning part, is integrally formed with the elastic body contact part 44. The tightener 64 is, for example, a pressed metallic member obtained by press working of a blank metal plate.

The inner contact parts 68, 68 of the pair of the tighteners 64, 64 are butted against the axially opposite end faces of the inner shaft member 66 in a state of contact, and the tighteners 64, 64 are tightened by the bolt member 46 and the nut 48, thereby being pressed against the axially opposite end faces of the inner shaft member 66. By so doing, the distance between opposed faces of the elastic body contact parts 44, 44 of the pair of the tighteners 64, 64 in the axial direction is set. In the present practical embodiment, the inner shaft member 66 constitutes the regulating part and the inner contact parts 68, 68 constitute the positioning part. The elastic body contact part 44 of the tightener 64 is pressed against the adjustment elastic body 38, and the adjustment elastic body 38 is clasped and compressed axially between the side wall 30 of the outer tube member 18 and the radially outer end of the tightener 64.

The amount of compressive deformation in the axial direction of the adjustment elastic body 38 due to the pair of the tighteners 64, 64 can be adjusted not only by the axial length dimension of the inner shaft member 66 serving as the regulating part, but also by the axial length dimension of the inner contact part 68 of the tightener 64. Therefore, in the present practical embodiment, it is also possible to adjust the amount of compressive deformation in the axial direction of the adjustment elastic body 38 by adjusting the axial length dimension of the inner contact part 68, without the need of changing the axial length dimension of the inner shaft member 66.

In the present practical embodiment, by adjusting and setting the axial length dimension of the inner contact part 68 of the tightener 64, the axial position of the projecting distal end face of the inner contact part 68, which is the contact face that is held in contact with the inner shaft member 66, and the axial position of the contact face of the elastic body contact part 44, which is held in contact with the adjustment elastic body 38, are different from each other. By so doing, while using a common structure for the bushing body 62 including the inner shaft member 66, it is possible to adjust the amount of compressive deformation of the adjustment elastic body 38, and to adjust the load threshold value at which the slide of the outer tube member 18 with respect to the outer sleeve 50 begins. For example, by preparing multiple types of the tighteners 64 whose inner contact parts 68 have mutually different axial length dimensions, then appropriately selecting the tightener 64 according to the required spring characteristics, the slide of the outer tube member 18 with respect to the outer sleeve 50 can be controlled.

While the present disclosure has been described in detail hereinabove in terms of the practical embodiments, the disclosure is not limited by the specific description thereof. For example, for the cross-sectional shape of the outer tube member, the groove shape shown in the preceding practical embodiment is desirable for efficiently acting the force in the radially outward direction by tightening the adjustment elastic body 38, but a shape other than the groove shape, such as a rectangular cross-section, can also be adopted.

Figure 8:
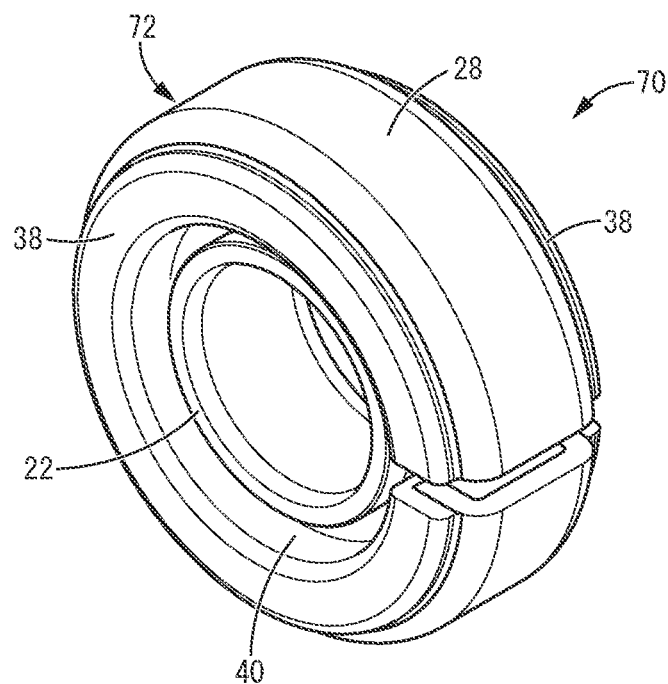
FIG. 8 is a perspective view of an integrally vulcanization molded component constituting a bushing as another practical embodiment of the present disclosure.
Figure 9:
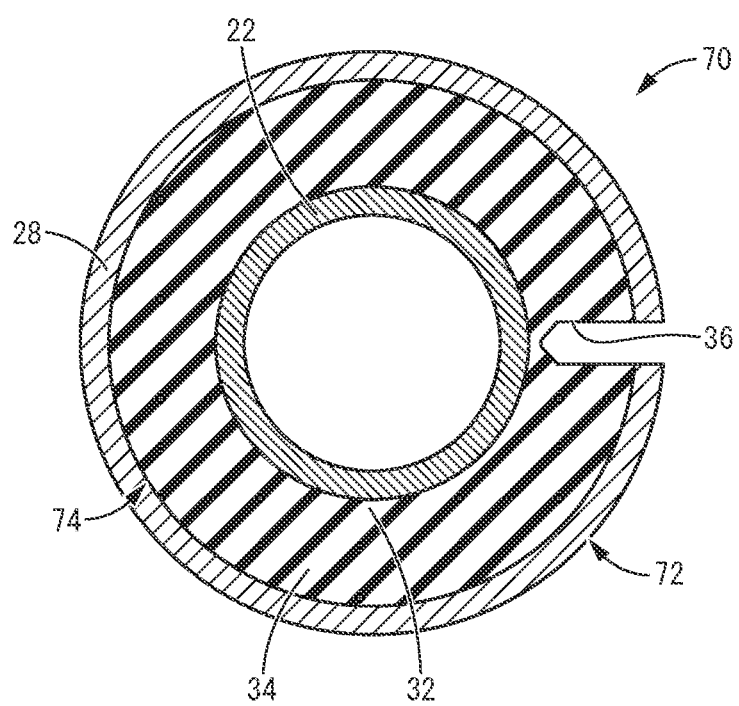
FIG. 9 is a cross sectional view of the integrally vulcanization molded component shown in FIG. 8.

The bushing body 12 of the preceding practical embodiment has a structure in which the outer tube member 18 is constituted by mutually independent outer constituent fittings 26, 26 each extending in the circumferential direction with a length of less than half a circumference, and the notches 36, 36 are formed on the diametrically opposite sides of the main rubber elastic body 20. However, for example, a structure such as an integrally vulcanization molded component 70 shown in FIGS. 8 and 9 can also be adopted. That is, in the integrally vulcanization molded component 70, an outer tube member 72 is a single member having a C-shaped annular form that is divided at a part in the circumferential direction, and a single notch 36 is provided to a main rubber elastic body 74 at a location corresponding to the divided portion of the outer tube member 72. In the integrally vulcanization molded component 70 of such structure, due to the compression of the adjustment elastic body 38 in the axial direction, the outer tube member 72 is deformed to open at the divided portion. Therefore, when the integrally vulcanization molded component 70 of the present practical embodiment is adopted in place of the bushing body 12 of the first practical embodiment, by adjusting the amount of compressive deformation of the adjustment elastic body 38 in the axial direction, it is possible to adjust the load threshold value at which the slide of the outer tube member 72 with respect to the outer sleeve 50 begins, thereby obtaining the same effect as in the preceding practical embodiment. In this way, it is acceptable as long as the outer tube member is divided at least at a part in the circumferential direction so as to be allowed to deform in a diameter enlarging manner, and the number of divided portions may be one, or two or more.

Figure 10:
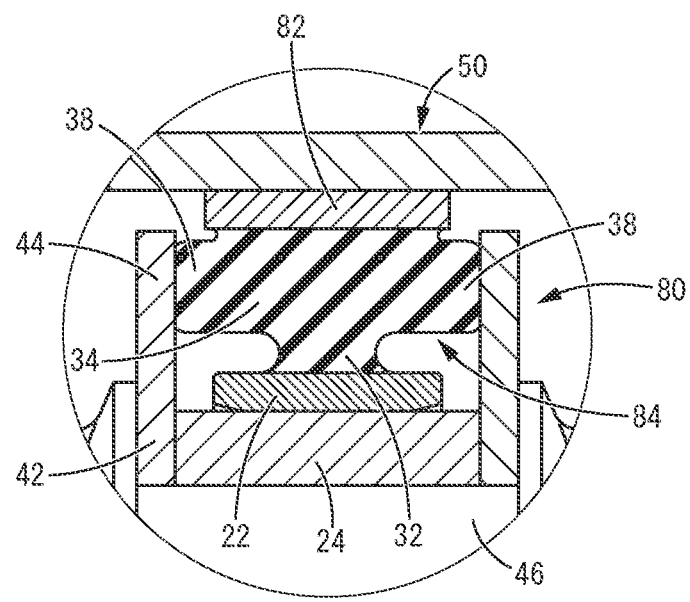
FIG. 10 is a cross sectional view showing a portion of a bushing as yet another practical embodiment of the present disclosure.

The adjustment elastic body is not limited to the structure provided on the axially outer face of the outer tube member as in the preceding practical embodiment. Specifically, for example, in a bushing 80 shown in FIG. 10, an outer tube member 82 does not have the side walls 30, 30 as in the preceding practical embodiment, but has an approximately cylindrical shape overall with a circumferentially divided portion, and is fastened to the outer circumferential surface of a main rubber elastic body 84. The main rubber elastic body 84 is provided with the adjustment elastic body 38 on the axially opposite sides, and the adjustment elastic body 38 protrudes axially outward further than the outer tube member 82. The main rubber elastic body 84 and the adjustment elastic body 38 in the present practical embodiment are not separated by the side wall 30 as in the preceding practical embodiment, but the radially outer portion 34 of the main rubber elastic body 84 and the adjustment elastic body 38 are integrally formed so as to be continuous in the axial direction. By the adjustment elastic body 38 and the main rubber elastic body 84 being compressed by the pair of the tighteners 14, 14 in the axial direction, the outer tube member 82 is deformed radially outward in a diameter enlarging manner, thereby adjusting the contact pressure of the outer tube member 82 on the outer sleeve 50.

The main rubber elastic body does not necessarily have to be fastened to the inner shaft member. For example, the inner circumferential surface of the main rubber elastic body may be overlapped on the inner shaft member without being fastened thereto. In this case, it is not essential to provide the fastening member 22 and the inner tube member 24 shown in the preceding practical embodiment as the inner shaft member, and for example, the inner shaft member can be constituted by the bolt member 46. Besides, the main rubber elastic body may be separated from the inner shaft member in a state where the tighteners 14 are not pressed against the adjustment elastic body 38. In this case, when the tightener 14 is pressed against the adjustment elastic body 38, the main rubber elastic body is deformed so as to swell in the radial direction, and the inner circumferential surface of the main rubber elastic body comes into contact with the inner shaft member. By so doing, the force toward the radially outer side which is exerted from the main rubber elastic body to the outer tube member 18 will be reliably obtained.

Figure 11:
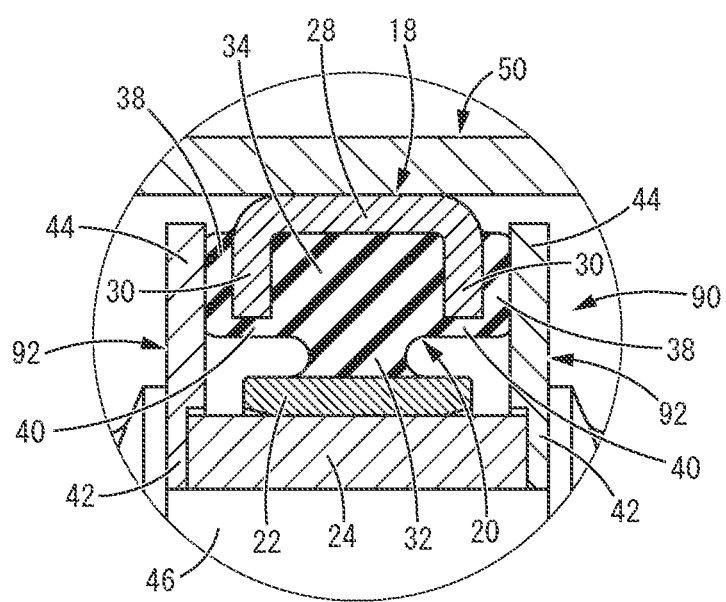
FIG. 11 is a cross sectional view showing a portion of a bushing as still yet another practical embodiment of the present disclosure.

For example, by making the axial dimension of the positioning part 42 of the tightener 14, which is overlapped on the inner tube member 24, and the axial dimension of the elastic body contact part 44 of the tightener 14, which is pressed against the adjustment elastic body 38, different from each other, the amount of compression of the adjustment elastic body 38 by the tightener 14 can also be adjusted without changing the length of the inner tube member 24. In order to make the axial dimensions of the positioning part 42 and the elastic body contact part 44 different from each other, for example, the axially protruding inner contact part 68 as in the second practical embodiment can be provided as the positioning part. It would also be possible to achieve the difference in axial dimensions between the positioning part 42 and the elastic body contact part 44 by making the positioning part 42 of the tightener 14 that is overlapped on the inner tube member 24 thinner or thicker and/or making the elastic body contact part 44 of the tightener 14 that is pressed against the adjustment elastic body 38 thicker or thinner. For example, by partially providing a separate thickening member to an annular-plate shaped member with a fixed thickness dimension, the tightener can be partially thickened at least in one of the positioning part 42 and the elastic body contact part 44. FIG. 11 exemplifies a bushing 90 including a tightener 92 whose positioning part 42 is made thinner.

The tightener 14 may be integrally provided with the inner shaft member 16. Specifically, for example, one tightener 14 may be integrally provided with the head part of the bolt member 46 and the other tightener 14 may be integrally provided with the nut 48. With this arrangement, by adjusting the amount of tightening of the nut 48 with respect to the bolt member 46, the amount of compressive deformation of the adjustment elastic body 38 can be adjusted.

In the second practical embodiment, it would also be acceptable that the inner contact part 68 of one tightener 14 protrudes further in the axial direction than the inner contact part 68 of the other tightener 14 does, so that the inner contact part 68 of one tightener 14 is overlapped by the inner circumferential surface of the main rubber elastic body 20 thereby constituting the inner shaft member. In this case, by the inner contact part 68 of one tightener 14 being butted against the inner contact part 68 of the other tightener 14 in the axial direction, it is possible to set the distance in the axial direction between the elastic body contact parts 44, 44 of the tighteners 14, 14, thereby setting the amount of compressive deformation of the adjustment elastic body 38.

The pair of the tighteners is not limited to those that are approximately identical (symmetrical) to each other as in the preceding practical embodiment, but may be different from each other. Such a mutually different pair of tighteners include, for example, the tighteners in which the axial dimensions of the inner contact parts are mutually different as described above, the tighteners in which the thickness dimensions or the outside diameter dimensions are mutually different, the tighteners in which the shapes viewed in the axial direction are mutually different, and the like. Furthermore, there may be a case where one tightener is integrally formed with the inner shaft member and the other tightener is formed separately from the inner shaft member, or the like.

The preceding practical embodiment described an example in which the attachment tube is constituted by the outer sleeve 50 serving as the tubular body and the arm eye 54 serving as the tube component subject to vibration damping linkage, but the attachment tube can also be constituted by, for example, only the tube component subject to vibration damping linkage. That is, the outer tube member of the tubular vibration-damping device according to the present disclosure can be directly inserted into the tube component subject to vibration damping linkage and slidably attached thereto without interposing the tubular body.

The specific configuration of the attachment tube and the like can be designed as appropriate depending on the applicable part of the tubular vibration-damping device or the like, and the tubular vibration-damping device according to the present disclosure is acceptable as long as the adjustment mechanism of the linkage characteristics in the axial direction can be realized by a pair of tighteners. For example, in the case where the attachment tube is constituted by the component subject to vibration damping linkage or the like, it is possible to recognize the tubular vibration-damping device of the present disclosure as an embodiment that does not include the attachment tube. Furthermore, as long as adjustment, setting, tuning and the like of the linkage characteristics in the axial direction is required by a pair of tighteners, the disclosure is applicable to various types of tubular vibration-damping devices, without being limited to the preceding practical embodiment illustrating application to a suspension bushing. For example, in addition to the suspension bushing as shown by way of example, a vibration damper for structural objects as shown in Japanese Unexamined Patent Publication No. JP-A-2016-061364, a vehicle body reinforcing device as shown in U.S. Publication No. US 2018/0149227 A1 and the like can be specifically listed as tubular vibration-damping devices for which the linkage characteristics in the axial direction are required. Besides, the tubular vibration-damping device of the present disclosure can also be applied to body mounts, differential mounts, engine mounts, etc., where load and vibration input are expected not only in the axial direction but also in the axis-perpendicular direction.

In the preceding practical embodiment, the detent part is constituted by the constricted part 52 of the outer sleeve 50, but the structure of the detent part is not limited. Specifically, for example, the stopper part protruding radially outward and having a larger diameter than the outer sleeve 50 may be provided to the portion of the bolt member 46 extending axially outward further than the outer sleeve 50, and the contact between the said stopper part and the outer sleeve 50 in the axial direction makes it possible to prevent the bushing 10 from slipping out of the outer sleeve 50 to one side in the axial direction (the side corresponding to the right side in FIG. 1). In this case, the constricted part 52 on the one side in the axial direction may be omitted, and the stopper part constitutes the detent part on the one side in the axial direction.

What is claimed is:

1. A tubular vibration-damping device comprising an inner shaft member and an outer tube member connected by a main rubber elastic body, the outer tube member being configured to be attached to an attachment tube in an inserted state where the outer tube member is slidable in an axial direction, wherein
    the outer tube member is divided at least at a part in a circumferential direction and is deformable or displaceable in a radial direction,
    a pair of tighteners are disposed on axially opposite sides of the main rubber elastic body,
    the main rubber elastic body is fastened to an inner circumferential surface of the outer tube member,
    an adjustment elastic body against which the pair of the tighteners are pressed is integrally formed with axially opposite side portions of the main rubber elastic body, and
    sliding resistance in the axial direction between an outer circumferential surface of the outer tube member and an inner circumferential surface of the attachment tube is settable depending on a pressing force of the pair of the tighteners against the adjustment elastic body.

2. The tubular vibration-damping device according to claim 1, wherein
    the pair of the tighteners are opposed to the outer tube member in the axial direction,
    the adjustment elastic body is disposed on an opposed face of the outer tube member that is opposed to each of the pair of the tighteners in the axial direction, and
    the main rubber elastic body and the adjustment elastic body are integrally formed on an inner circumference of the outer tube member by being integrally connected by a connecting rubber.

3. The tubular vibration-damping device according to claim 2, wherein
    the outer tube member has a groove-shaped cross section that opens radially inward, and the outer tube member includes a peripheral wall part extending in the axial direction and a pair of support parts projecting radially inward from axially opposite ends of the peripheral wall part,
    the adjustment elastic body is fastened to an axially outer face of each of the pair of the support parts, and
    an inside of the outer tube member surrounded by the peripheral wall part and the pair of the support parts is filled with the main rubber elastic body.

4. The tubular vibration-damping device according to claim 1, wherein
    the pair of the tighteners have an annular-plate shape, and
    a radially inner portion of the pair of the tighteners includes a positioning part that is positioned with respect to the inner shaft member in the axial direction.

5. The tubular vibration-damping device according to claim 4, wherein
    the inner shaft member includes a regulating part that is disposed between axially opposed faces of the pair of the tighteners and regulates a distance between the axially opposed faces of the pair of the tighteners, and
    a contact portion of the pair of the tighteners that is held in contact with the regulating part constitutes the positioning part.

6. The tubular vibration-damping device according to claim 4, wherein
    the positioning part of the pair of the tighteners is constituted by an inner contact part that is held in contact with the inner shaft member from an axially outer side,
    a radially outer portion of the pair of the tighteners includes an elastic body contact part that is held in contact with the adjustment elastic body from the axially outer side, and
    an axial position of a contact face of the inner contact part of the pair of the tighteners that is held in contact with the inner shaft member and an axial position of a contact face of the elastic body contact part that is held in contact with the adjustment elastic body are different from each other.

7. The tubular vibration-damping device according to claim 1, further comprising a tubular body configured to be fixedly mounted onto a component subject to vibration damping linkage and constitute the attachment tube, wherein the outer tube member is attached to the tubular body in the inserted state where the outer tube member is slidable in the axial direction, and a detent part configured to limit an amount of movement of the outer tube member due to a slide in the axial direction with respect to the tubular body is provided.

* * * * *